Figure 3:
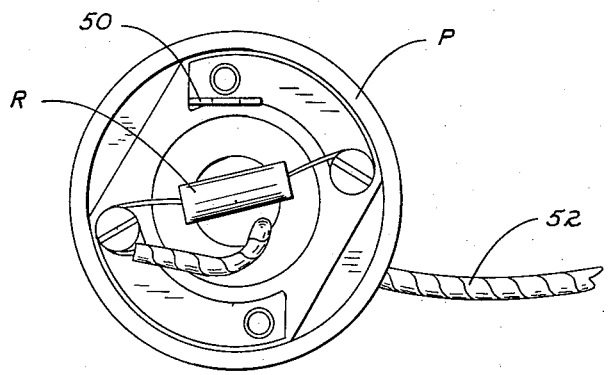

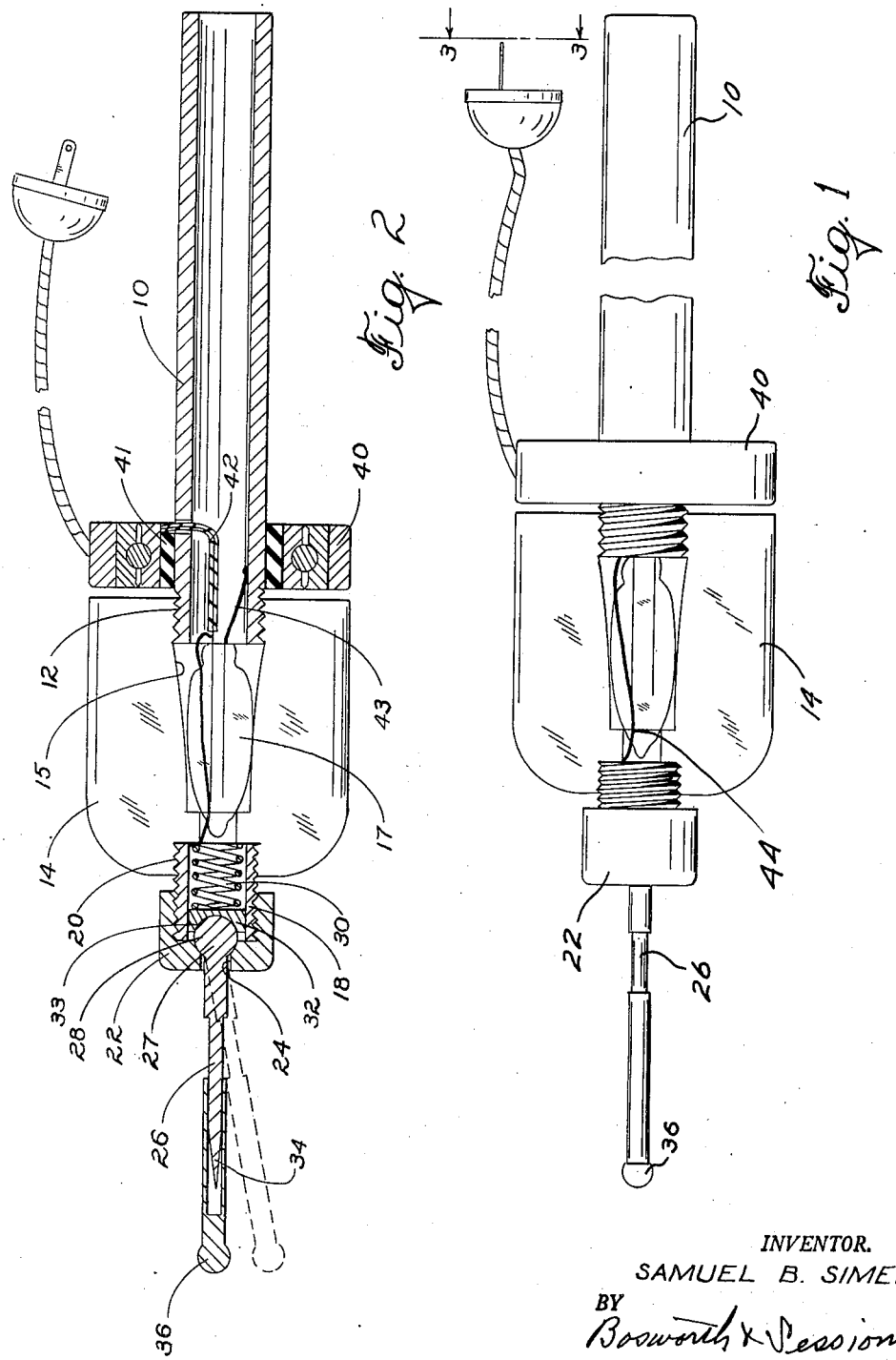

Dec. 6, 1949 S. B. SIMER 2,490,483
LOCATING DEVICE
Filed Aug. 22, 1946 2 Sheets-Sheet 2

INVENTOR.
SAMUEL B. SIMER
BY Bosworth & Sessions
ATTORNEYS

Patented Dec. 6, 1949

2,490,483

UNITED STATES PATENT OFFICE 2,490,483

LOCATING DEVICE

Samuel B. Simer, Cleveland, Ohio

Application August 22, 1946, Serial No. 692,160

2 Claims. (Cl. 33—169)

This invention relates to devices for indicating accurately, with respect to a tool holder of a machine, the position of a work piece in a vise or other clamping device on the machine. More particularly it relates to devices that afford an indication of such position by means of a light in an electric circuit to locate the tool and work piece accurately with respect to each other preparatory to a machining operation.

Such locating or centering devices have been utilized on machine tools and frequently have employed an electric current from an external source to afford the desired indication. In particular such devices have relied on completion of a circuit by attachment of the device to the machine tool and contact through a current conducting work piece to establish a circuit to operate an indicator. One type of such device has included an electric light that became lit upon contact between a contact arm on the device and the work piece to complete a circuit through the metallic work piece and the metallic parts of the machine tool, including a rotating spindle or the like in which the device was mounted.

One form of such indicating device has been adapted to fit in the rotating spindle of a machine tool and to be brought gradually into alignment with a surface of a stationary work piece. This was accomplished by providing a pivoted contact arm that could lie in alignment with the spindle axis or be shifted to such position that an unsupported ball shaped end rotated in a circle with its center on the axis. In operation the spindle and work piece were moved relative to each other to cause the work piece to push on the ball end and reduce the radius of this circle gradually until it became a point at which time the contact arm was aligned with the spindle and the contact arm was in continuous engagement with the work piece. At this time the position of the work piece with respect to the spindle was known and this position could be readily recorded by reading the dial on the tool wheel by which the work piece was moved. The only compensation required was in an amount equal to the radius of the ball end of the contact arm.

In such prior devices the lamp lighting circuit was completed through the work piece and the light was lit when the contact arm was in contact with the work piece. As the rotating contact arm approached closer and closer to alignment with its axis of rotation the light was lit for a greater fraction of time during each rotation of the contact arm. As the position of alignment was approached this, due to the operator's faculty for persistence of vision, caused the light to appear continuously illuminated when in fact it was only illuminated intermittently. As a result, the operator's persistence of vision would lead him to believe he had reached a position of alignment of the contact arm and its axis when in fact it could be some measurable distance away. In contrast to such prior art constructions my invention provides a device that overcomes the unavoidable persistence of vision due to the reaction time of the eyes of the operator.

It is the general object of this invention to provide an improved locating device that can be used to determine accurately the position of a tool holder and work piece with respect to each other. A further object is to provide a visual indicator that is not subject to inaccuracy of use by reason of the operator's persistence of vision. Another object of this invention is to provide such a locating tool that affords a visual indication and is adapted for use with various types of machine tools to permit the location of work pieces in a vise or chuck to be rapidly determined. Still another object is to provide an indicator that is simple to use and reduces to a minimum time and labor expended in setting up material for a machining operation. Still a further object is to provide a locating device that operates from a commonly available current source to light a high voltage low current lamp or indicator such as a neon lamp. A still further object is to provide a device of the type indicated in which a circuit that lights a lamp is short circuited, causing the indicating light to go out, at the time contact is made by the contact arm with the work piece.

Other objects of the invention will become apparent from the following description and from the drawings in which the preferred form of the invention is set forth. The novel features of the invention are summarized in the claims.

Figure 4:
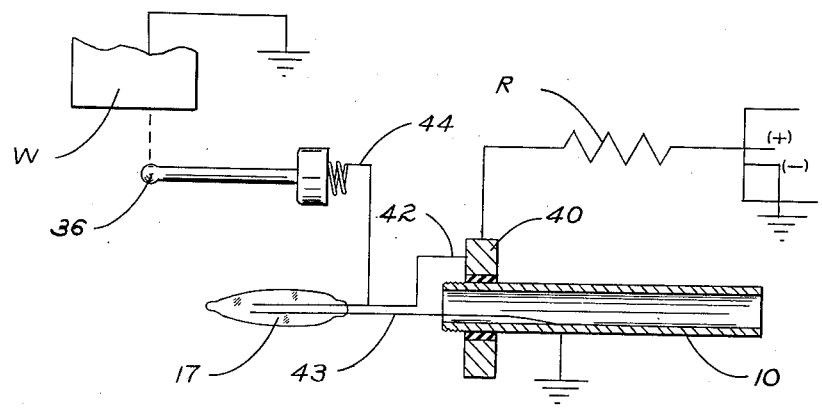

In the drawings, Figure 1 is a side elevation of the preferred form of the invention; Figure 2 is a vertical section through the centering device in a plane parallel to Figure 1; Figure 3 is a plan view of the base of the single pronged electrical plug used to connect with the current source; and Figure 4 is a schematic diagram of the electrical circuit employed in this invention.

The operation of a preferred embodiment of the invention may depend upon current supplied from the positive lead of a 110 volt D. C. source to light a high voltage low current tube, such as a neon bulb, in the indicating device. The device is attached to a machine tool, the metal of which completes the electrical circuit through the machine to a ground return to the negative side of the current source and lights the tube or light. A pivotally mounted contact arm on the device is engaged by a work piece and to this end the device is mounted in the rotating spindle of the machine tool and revolves on the spindle axis while the work piece is moved toward the contact arm. When the end of the arm and the work piece contact during rotation of the former, the electrical circuit is shorted to let the current pass along a lower resistance circuit to ground through the work piece instead of through the tube and thus the light in the tube is extinguished. When the contact arm is directly aligned with the spindle axis and constant contact is achieved with the work piece the latter is as close to the axis of the spindle as the thickness of the contact arm will permit. If the arm has a ball end this distance from the spindle axis is equal to one half the radius of the ball at the outer end of the contact arm. During such constant contact the indicating light is continually shorted and thus remains dark. As the work piece approaches this position of constant contact the intervals in which the indicator is lighted decrease, rather than increase as in prior devices, and this eliminates faulty alignment as heretofore caused by the operator's persistence of vision. When the work piece has reached a position where the light is continually dark the position of the working surface with respect to the spindle of the machine tool is simply calculated and the work piece may then be positioned by the use of the machine tool verniers for the desired cutting stroke.

Referring now to the drawings and particularly to Figures 1 and 2 it will be seen that the locating device comprises a metal tubular or sleeve member 10 with a cylindrical outer surface adapted to be received in a chuck or other gripping device. The spindle in which the tube is mounted forms part of a machine and in the usual use of the invention rotates to carry a cutting tool. An example of such use is found in a milling machine in which the locating device is mounted in the spindle to permit the position of a work piece secured in a vise to be determined with respect to the axis of rotation of the tool.

At its forward end the tube 10 is externally threaded at 12 to be received in a corresponding internal thread on a transparent plastic dielectric member 14. This member is provided with an internal bore 15 in which is mounted a high voltage bulb 17, preferably a small neon lamp. The member 14 is transparent in order that the light from the bulb may be seen clearly through the side wall to provide a ready indication to the user. The bore 15 is formed closely to receive the bulb 17 and hold it in position by virtue of the fit between the bore and the outer surface of the bulb and thus eliminate the necessity for any special fastening device to hold the bulb in position.

At its forward end the transparent member 14 is formed to receive and support the contact arm that makes engagement with the work piece. To this end a short externally threaded tubular member 18 is provided that is received in a threaded recess 20 of the member 14. At its outer end the member 18 is threadingly received within a hollow nut 22 as illustrated in Figure 2. The nut is provided with a passage 24 through which passes the shank of a contact arm 26 that at its inner end is ball shaped as shown at 27. The bore 24 adjacent the interior of the nut 22 is formed with an annular surface 28 corresponding to the shape of the ball to provide a seat therefore.

The ball 27 is held against the seat 28 by a coil spring 30 that bears at one end against a shoulder of the member 14 and at the other end against a ring 32 in which is a second seat 33 also corresponding in shape to the exterior of the ball 27. By virtue of this construction the ball is firmly held between the seats 28 and 33 with sufficient pressure to maintain it in the position shown and yet permit its pivotal movement about the center of the ball 27 as hereafter described.

Due to the fact that the bore 24 is somewhat larger than the diameter of the shank 26 the contact arm may be rocked from the solid line position to the dotted line position of Figure 2. In using the device the contact arm is first placed in the dotted line position and by adjustment between the work piece and the spindle gradually moved to the solid line or axially aligned position in a manner hereafter to be described. The end of the shank 26 is pointed as shown at 34 to permit the device to be centered with an opening such as a center punched depression in the work piece. In this use the point enters and lies against the bottom of the depression at its center. A ball shaped end 36 is used in locating a flat side of a work piece with respect to the spindle and is mounted by slipping it over the point 34 of the shank as shown in Figure 2.

To insure completion of an electric circuit through the ball 36 it, as well as its supporting parts including the shank 26, the threaded member 18 and the seat member 32 all are made of metal. One lead 44 from the lamp 17 is made fast to a portion of this metal assembly so that direct electrical connection is made with the ball 36. The other lead is secured to the inside of the sleeve 10 to make contact with it.

Current is supplied to the lamp through an outer current conducting ring 40 that remains stationary while the members 10 and 14 including the lamp 17 and the contact arm are in rotation. An antifriction ball bearing is mounted with its inner race secured to an insulating ring 41 rigid with the current conducting sleeve 10 and its outer race rigid with the ring 40. Balls lie between the two races to permit relative rotation between the ring 40 and the sleeve 10. Electrical connection is made from the ring 40 through the ball bearing races and balls to a lead 42 to the lamp. This lead is connected with the lead 44 connected to the contact arm as heretofore described. The other lead of the lamp, indicated at 43, is the one secured to the metal sleeve 10.

The electrical wiring diagram for the device is shown in Figure 4 to indicate how the lamp is lit and extinguished during the operation of the device. Referring now to that figure, current is taken off the positive lead of an 110 volt D. C. source and passes through a 50,000 ohm resistance R to the ring 40. When the contact arm 36 is out of engagement with a work piece W, current enters the circuit, passes through the resistance R and the ball bearing to the lead 42, through the lamp and then through the lead 43 to the sleeve 10. From the sleeve 10 it passes through the machine tool to ground and completes the circuit to the ground or negative side of the current source to light the lamp. Now, if contact is made between the contact arm 36 and the work piece W the lower resistance of this new circuit will cause current to pass from the lead 42 directly through the lead 44 that is secured to the contact arm 36, then to the work piece and through it and the machine to a ground return. This short circuits the lamp by virtue of its higher internal resistance and extinguishes it.

In order to provide a compact assembly the resistance R is mounted directly within the plug P with which connection is made to the source of current by means of a contact prong 50 that makes contact with the positive side of the supply source. Current entering the plug and passing through the resistance passes along a cable 52 until it makes contact with the ring 40.

From the description given above it will be apparent that during use the lamp 17 will be lit at all times when contact between the work piece W and the contact arm at 36 is broken. In the same manner the lamp will be extinguished each time such contact is established to short circuit the lamp. Thus when the work piece W and the locating device are so positioned with respect to each other that the ball end 36, or in the other case the point 34, are in alignment with their axis of rotation, continuous contact is made with the work piece and the lamp 17 is continually extinguished.

The embodiment of the invention illustrated and described herein is primarily intended for use in the rotating spindle of a machine tool. It will be apparent that other embodiments and modifications may be provided within the scope of the invention and that it is susceptible of use in circumstances other than those indicated above. For instance in certain cases the locating device may be held stationary with respect to the machine tool while the work piece is rotated.

From the foregoing description it will be seen that I have provided an improved locating device of the type indicated of such construction that the operator's persistence of vision is not of disadvantage. For instance, in all cases where approach to a final desired adjustment of a tool or instrument is indicated by a light or sound, recurring very short periods of light or sound are more easily perceived than the alternative of short periods of darkness or silence, owing to the persistence of the senses involved. Among other features, the device operates in a manner opposite to those heretofore known in that a position of alignment between the device and a work piece results in extinguishing the indicating light instead of illuminating it.

I claim.

1. In a device of the class described for determining the position of a work piece with respect to a rotating spindle of a machine by which said work piece is supported, a current conducting sleeve member adapted to be received within said spindle and secured for rotation therewith, an illuminating device supported by said member with two leads for supplying current thereto, a contact arm secured to said member for rotation therewith and including at its end a current conducting contact portion, an electrical connection between one of said leads and said contacting portion, an electrical connection between the other of said leads and said sleeve, a dielectric ring mounted on said sleeve, an antifriction bearing with its inner race mounted on said dielectric sleeve, means to make electrical connection between a source of current and the outer race of said bearing and an electrical connection from said inner race to said one lead.

2. In a device of the class described for determining the position of a work piece with respect to a rotating spindle of a machine by which said work piece is supported, a current conducting sleeve member adapted to be received within said spindle and secured for rotation therewith, a hollow transparent member rigidly secured to said sleeve, an illuminating device within the hollow portion of said member with two leads for supplying current thereto, a contact arm secured to said member for universal movement about the extended axis of said sleeve and including at its end a current conducting contact portion, an electrical connection between one of said leads and said contacting portion, an electrical connection between the other of said leads and said sleeve, a dielectric ring mounted on said sleeve, an antifriction bearing with its inner race mounted on said dielectric sleeve, means to make electrical connection with the outer race of said bearing including a device for connection to the positive side of a direct current supply and an electrical connection from said inner race to said one lead.

SAMUEL B. SIMER.

REFERENCES CITED

The following references are of record in the file of this patent:

UNITED STATES PATENTS

| Number | Name | Date |
| --- | --- | --- |
| 1,040,715 | Mann | Oct. 8, 1912 |
| 1,553,814 | Hansen | Sept. 15, 1925 |
| 2,090,178 | Brickner | Aug. 17, 1937 |
| 2,109,976 | Pierce | Mar. 1, 1938 |
| 2,383,550 | Homan et al. | Aug. 28, 1945 |